United States Patent
Hu et al.

(10) Patent No.: US 12,085,539 B1
(45) Date of Patent: Sep. 10, 2024

(54) GAS DIAPHRAGM DRIVEN RAPID SUPERCHARGING DEVICE BASED ON DIAMOND ANVIL CELL

(71) Applicant: Jilin University, Changchun (CN)

(72) Inventors: Kuo Hu, Changchun (CN); Ran Liu, Changchun (CN); Dongchang Li, Changchun (CN); Shucheng Liu, Changchun (CN); Yue Pan, Changchun (CN); Zhaodong Liu, Changchun (CN); Bingbing Liu, Changchun (CN)

(73) Assignee: JILIN UNIVERSITY, Changchun (CN)

(*) Notice: Subject to any disclaimer, the term of this patent is extended or adjusted under 35 U.S.C. 154(b) by 0 days.

(21) Appl. No.: 18/427,235

(22) Filed: Jan. 30, 2024

(51) Int. Cl.
*G01N 3/12* (2006.01)
*G01N 3/02* (2006.01)

(52) U.S. Cl.
CPC ............. *G01N 3/12* (2013.01); *G01N 3/02* (2013.01); *G01N 2203/0044* (2013.01)

(58) Field of Classification Search
CPC .. G01N 3/02; G01N 3/10; G01N 3/12; G01N 2203/0042; G01N 2203/0044
See application file for complete search history.

(56) References Cited

U.S. PATENT DOCUMENTS 5,693,345 A * 12/1997 Chen .................. G01N 21/0317
425/DIG. 26

FOREIGN PATENT DOCUMENTS

CN 201912921 U * 8/2011

OTHER PUBLICATIONS

Rivers et al., The COMPRES/GSECARS gas-loading system for diamond anvil cells at the Advanced Photon Source, Sep. 2008, High Pressure Research, vol. 28, No. 3, pp. 273-292 (Year: 2008).*
Bi-Han et al., "Millisecond time-resolved synchrotron radiation X-ray diffraction and high-pressure rapid compression device and its application", Acta Phys. Sin., Jan. 25, 2022, vol. 71, No. 10.
Ministry of Education, "High voltage control of topological material", Chinese Doctoral Dissertations Full-text Database Basic Sciences, Jan. 16, 2023, No. 02, Publisher: China Academic Journal (CD-ROM Edition) Electronic Magazine, Published in: CN.

* cited by examiner

*Primary Examiner* — Erika J. Villaluna
(74) *Attorney, Agent, or Firm* — James F. Lea, III; Gable Gotwals

(57) ABSTRACT

A gas diaphragm driven rapid supercharging device based on a diamond anvil cell is provided which includes a gas diaphragm, a diamond anvil cell press, a hard steel shell and a gas release component. The gas diaphragm and the diamond anvil cell press are positioned inside the hard steel shell, the gas diaphragm is positioned below the diamond anvil cell press, a first opening is formed in a top of the hard steel shell, and a second opening is formed in a bottom of the hard steel shell. The gas release component passes through the second opening of the hard steel shell to be connected with the gas diaphragm through a gas path, and the gas release component is configured for releasing gas at a first inflation speed in a standard pressure experiment, and inflating the gas diaphragm at different driving pressures to obtain a pressure calibration curve.

5 Claims, 3 Drawing Sheets

GAS DIAPHRAGM DRIVEN RAPID SUPERCHARGING DEVICE BASED ON DIAMOND ANVIL CELL

CROSS-REFERENCE TO RELATED APPLICATION

This patent application claims the benefit and priority of Chinese Patent Application No. 202310847124.2, entitled "GAS DIAPHRAGM DRIVEN RAPID SUPERCHARGING DEVICE BASED ON DIAMOND ANVIL CELL" filed on Jul. 12, 2023, the disclosure of which is incorporated by reference herein in its entirety as part of the present application.

TECHNICAL FIELD

The present disclosure relates to the research field of rapid supercharging devices, in particular to a gas diaphragm driven rapid supercharging device based on a diamond anvil cell.

BACKGROUND

The research and development of the rapid supercharging devices is the basis of studying the state change law of matters under high pressure and high temperature, and play an important role in promoting the development of basic disciplines such as condensed matter physics, atoms and molecules, planets and geophysics. Rapid loading of millimeter high pressure is realized, and the changing law of matters under rapid compressing process is explored, so that further development of new material interception, aviation technology, explosion mechanics and energy engineering physics can be facilitated.

At present, the rapid supercharging devices refer to the dynamic diamond anvil cell, the air gun loading and the laser loading rapid supercharging device. The dynamic diamond anvil cell usually applies the piezoelectric ceramic fittings to apply pressure in milliseconds. However, the press usually needs to be customized and is expensive. Therefore, it is necessary to develop a rapid supercharging device which can be coupled with the common commercial diamond anvil cell press to reduce the experimental cost.

SUMMARY

The embodiments aim to provide a gas diaphragm driven rapid supercharging device based on a diamond anvil cell, which rapidly inflates a gas diaphragm by a gas release component to realize a rapid supercharging effect, so that the experimental cost of the rapid supercharging device is reduced.

In order to achieve the above-mentioned purpose, the present disclosure provides the following scheme.

A gas diaphragm driven rapid supercharging device based on diamond anvil cells specifically includes:
  a gas diaphragm, a diamond anvil cell press, a hard steel shell and a gas release component;
  the gas diaphragm and the diamond anvil cell press are positioned inside the hard steel shell, the gas diaphragm is positioned below the diamond anvil cell press, a first opening is formed in a top of the hard steel shell, and a second opening is formed in a bottom of the hard steel shell; and
  the gas release component passes through the second opening of the hard steel shell to be connected with the gas diaphragm through a first gas path, and the gas release component is configured for releasing gas at a first inflation speed in a standard pressure experiment, and inflating the gas diaphragm at different driving pressures to obtain a pressure calibration curve; and the gas release component is configured for presetting a driving pressure according to the pressure calibration curve in a supercharging experiment, and inflating the gas diaphragm at a second inflation speed.

In some embodiments, the gas release component may include:
  a gas bottle, a pressure controller, a first valve, a second valve, a gas accumulator and an electromagnetic valve;
  the gas bottle may be connected with the pressure controller through a second gas path, the pressure controller may be respectively connected with a first port of the first valve and a first port of the second valve through third gas paths, and a second port of the first valve may be connected with the gas diaphragm through a fourth gas path, a second port of the second valve may be connected with the gas accumulator through a fifth gas path, the gas accumulator may be connected with an air inlet of the electromagnetic valve through a sixth gas path, and an air outlet of the electromagnetic valve may be connected with the gas diaphragm through a seventh gas path;
  in the standard pressure experiment, the first valve may be opened, the second valve may be closed, the gas bottle may input the gas into the pressure controller, and the pressure controller may be configured for adjusting a speed and a pressure of the gas passing through the first valve, so that the gas may be released at the first inflation speed and inflated into the gas diaphragm at different driving pressures to obtain the pressure calibration curve;
  in the supercharging experiment, the second valve may be opened, the first valve may be closed, the gas bottle may input the gas into the pressure controller; the pressure controller may preset the driving pressure according to the pressure calibration curve, and may adjust a speed and a pressure of the gas passing through the second valve, so that the gas may be inflated into the gas accumulator and a preset value of the driving pressure may be reached; and when a pressure of the gas in the gas accumulator may reach the preset value, the second valve may be closed, the electromagnetic valve may be opened and closed at first opening and closing time, and the gas accumulator may inflate the gas diaphragm at the second inflation speed.

In some embodiments, the gas diaphragm driven rapid supercharging device based on diamond anvil cells may further include:
  a ruby standard pressure system;
  the ruby standard pressure system may be arranged above the diamond anvil cell press, and the ruby standard pressure system may be configured for calibrating ruby pressure changes in the diamond anvil cell press.

In some embodiments, the gas release component may further include:
  a pressure gauge; and
  the pressure gauge may be positioned between the gas accumulator and the electromagnetic valve, and the pressure gauge may be configured for measuring the pressure of the gas in the gas accumulator.

In some embodiments, the gas diaphragm driven rapid supercharging device based on diamond anvil cells may further include:

a pressure transmitter and an oscilloscope;
the pressure transmitter may be connected with the electromagnetic valve through an eighth gas path and may be connected with the gas diaphragm through a ninth gas path, and the pressure transmitter may be configured for detecting instantaneous changes of a gas pressure and converting gas pressure changes into electrical signals; and
the oscilloscope may be electrically connected with the pressure transmitter, and the oscilloscope may be configured for receiving and displaying the electrical signals.

In some embodiments, the gas diaphragm driven rapid supercharging device based on diamond anvil cells may further include:
cushion blocks;
the cushion blocks may be positioned among the diamond anvil cell press, the gas diaphragm and the hard steel shell, and the cushion blocks may be configured for filling gaps.

In some embodiments, the gas may be nitrogen.

According to the specific embodiments provided by the embodiments, the embodiments have the following technical effects.

According to the embodiments, the gas release component is replaced with the piezoelectric ceramic fittings in the prior art, which achieves a rapid supercharging effect by rapidly inflation of the gas release component, so that the experimental cost of the rapid supercharging device is reduced.

BRIEF DESCRIPTION OF THE DRAWINGS

To describe the technical scheme in the embodiments of the present disclosure or in the prior art more clearly, the following briefly introduces the drawings required for describing the embodiments. Apparently, the drawings in the following description show merely some embodiments of the present disclosure, and those skilled in the art may still derive other drawings from these drawings without creative efforts.

Figure 1:
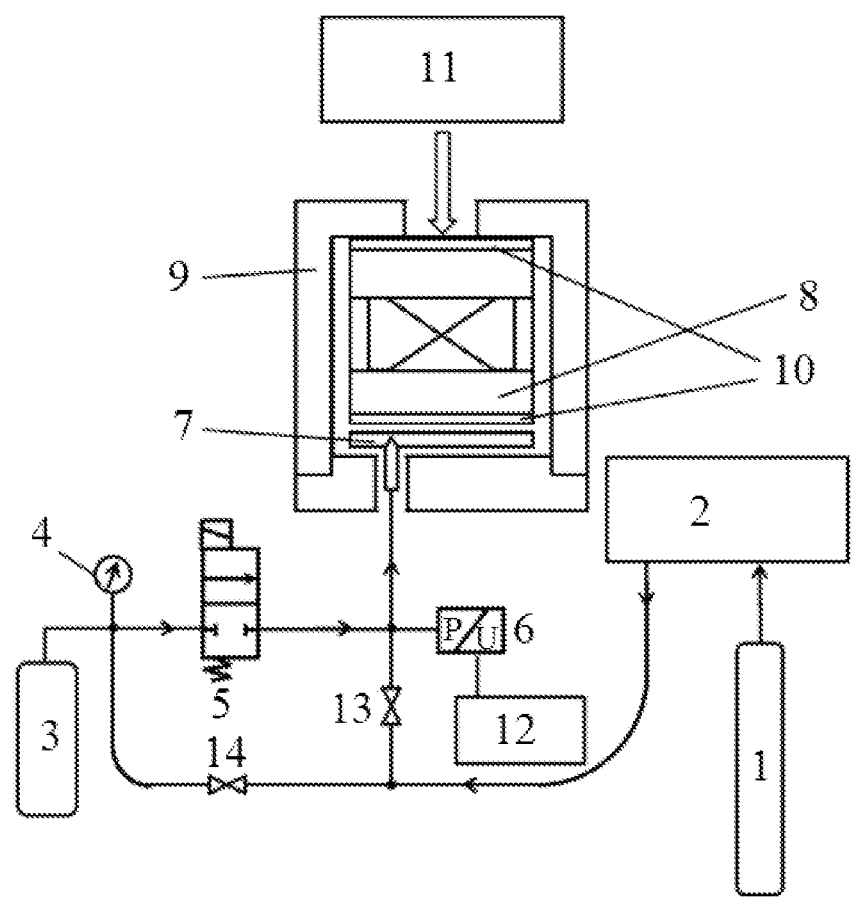
FIG. 1 is a structural schematic diagram of a gas diaphragm driven rapid supercharging device based on a diamond anvil cell provided by an embodiment of the present disclosure.

LIST OF THE REFERENCE CHARACTERS 1 gas bottle; 2 pressure controller; 3 gas accumulator; 4 pressure gauge; 5 electromagnetic valve; 6 pressure transmitter; 7 gas diaphragm; 8 diamond anvil cell press; 9 hard steel shell; 10 cushion block; 11 ruby standard pressure system; 12 oscilloscope; 13 first valve; and 14 second valve.

DETAILED DESCRIPTION OF THE EMBODIMENTS

The following clearly and completely describes the technical scheme in the embodiments of the present disclosure with reference to the embodiments of the present disclosure. Apparently, the described embodiments are merely a part rather than all of the embodiments of the present disclosure. Based on the embodiment in the present disclosure, all other embodiments obtained by the ordinary technical staff in the art under the premise of without contributing creative labor belong to the scope protected by the present disclosure.

The embodiments aim to provide a gas diaphragm driven rapid supercharging device based on a diamond anvil cell, which rapidly inflates a gas diaphragm by a gas release component to realize a rapid supercharging effect, so that the experimental cost of the rapid supercharging device is reduced.

To make the above-mentioned purpose, features and advantages of the present disclosure clearer and more comprehensible, the present disclosure is further described in detail below with reference to the drawings and specific embodiments.

As shown in FIG. 1, the present disclosure provides the gas diaphragm driven rapid supercharging device based on the diamond anvil cell, which specifically includes a gas diaphragm 7, a diamond anvil cell press 8, a hard steel shell 9 and a gas release component.

The gas diaphragm 7 and the diamond anvil cell press 8 are positioned inside the hard steel shell 9. The gas diaphragm 7 is positioned below the diamond anvil cell press 8. A first opening is formed in a top of the hard steel shell 9, and a second opening is formed in a bottom of the hard steel shell 9. The gas diaphragm 7 is configured for applying pressure to the diamond anvil cell press 8 through the volume expansion of the gas diaphragm 7 when the gas released from the gas accumulator 3 is introduced into the gas diaphragm 7. The hard steel shell 9 is configured for loading the diamond anvil cell press 8 and the gas diaphragm 7. The diamond anvil cell press 8 is configured for generating the high pressure.

The gas release component passes through the second opening of the hard steel shell 9 to be connected with the gas diaphragm 7 through a gas path. The gas release component is configured for releasing the gas at a first inflation speed in a standard pressure experiment, and inflating the gas diaphragm 7 at different driving pressures to obtain a pressure calibration curve. The gas release component is configured for presetting a driving pressure according to the pressure calibration curve in a supercharging experiment, and inflating the gas diaphragm 7 at a second inflation speed.

The gas release component specifically includes: a gas bottle 1, a pressure controller 2, a first valve 13, a second valve 14, a gas accumulator 3 and an electromagnetic valve 5.

The gas bottle 1 is connected with the pressure controller 2 through a gas path. The pressure controller 2 is respectively connected with a first port of the first valve 13 and a first port of the second valve 14 through gas paths. A second port of the first valve 13 is connected with the gas diaphragm 7 through a gas path. A second port of the second valve 14 is connected with the gas accumulator 3 through a gas path. The gas accumulator 3 is connected with an air inlet of the electromagnetic valve 5 through a gas path. An air outlet of the electromagnetic valve 5 is connected with the gas diaphragm 7 through a gas path. The gas bottle 1 is configured for providing the gas. The pressure controller 2 is configured for adjusting the speed and the pressure for outputting the gas. The model of the pressure controller 2 is Druck PACE 6000. The first valve 13 is a non-rapid supercharging valve switch. The second valve 14 is a gas accumulation energy valve switch. The gas accumulator 3 is configured for accumulating high-pressure gas. The electromagnetic valve 5 is configured for rapid switching, and the opening and the closing of the valve can be completed within 10 ms. The model of the electromagnetic valve 5 is ZC51-6B-16.

In the standard pressure experiment, the first valve 13 is opened, the second valve 14 is closed, the gas bottle 1 inputs the gas into the pressure controller 2, and the pressure controller 2 is configured for adjusting the speed and the pressure of the gas passing through the first valve 13, so that the gas is released at the first inflation speed and inflated into the gas diaphragm 7 at different driving pressures to obtain the pressure calibration curve. The first valve 13 and the second valve 14 are manual valves.

In the supercharging experiment, the second valve 14 is opened, the first valve 13 is closed, and the gas bottle 1 inputs the gas into the pressure controller 2. The pressure controller 2 presets the driving pressure according to the pressure calibration curve, and adjusts the speed and the pressure of the gas passing through the second valve 14, so that the gas is inflated into the gas accumulator 3 and a preset value of the driving pressure is reached. When the pressure of the gas in the gas accumulator 3 reaches the preset value, the second valve 14 is closed, the electromagnetic valve 5 is opened and closed at first opening and closing time, and the gas accumulator inflates the gas diaphragm 7 at the second inflation speed.

A ruby standard pressure system 11 is arranged above the diamond anvil cell press 8, and the ruby standard pressure system 11 is configured for calibrating ruby pressure changes in the diamond anvil cell press 8. A light path of the ruby standard pressure system 11 is centered with diamond anvil surfaces of the diamond anvil cell press 8, and the pressure in a pressure chamber is calibrated by detecting ruby fluorescence peak positions in common commercial diamond anvil cells.

The pressure gauge 4 is positioned between the gas accumulator 3 and the electromagnetic valve 5, and the pressure gauge 4 is configured for measuring the pressure of the gas in the gas accumulator 3.

The pressure transmitter 6 is respectively connected with the electromagnetic valve 5 and the gas diaphragm 7 through gas paths. The pressure transmitter 6 is configured for detecting the instantaneous changes of gas pressure and converting gas pressure changes into an electrical signals. The pressure transmitter 6 is extremely high in inherent frequency and wide and excellent in bandwidth, and can detect instantaneous gas pressure changes.

The oscilloscope 12 is electrically connected with the pressure transmitter 6, and the oscilloscope 12 is configured for receiving and displaying the electrical signals.

The cushion blocks 10 are positioned among the diamond anvil cell press 8, the gas diaphragm 7 and the hard steel shell 9, and the cushion blocks 10 are configured for filling gaps. When the ruby standard pressure system 11 is installed above the diamond anvil cell press 8, the cushion blocks 10 may further be configured for filling gaps among the diamond anvil cell press 8, the ruby standard pressure system 11 and the hard steel shell 9. Further, the gaps of different sizes may also be adapted by increasing or decreasing the number of the cushion blocks 10.

The gas used in the present disclosure is nitrogen.

The device has the function of rapid supercharging, and the pressure may be loaded to 23 GPa within 20 ms.

Specific technical schemes are as follows.

A method for the gas diaphragm driven rapid supercharging device includes the following steps.

Figure 2:
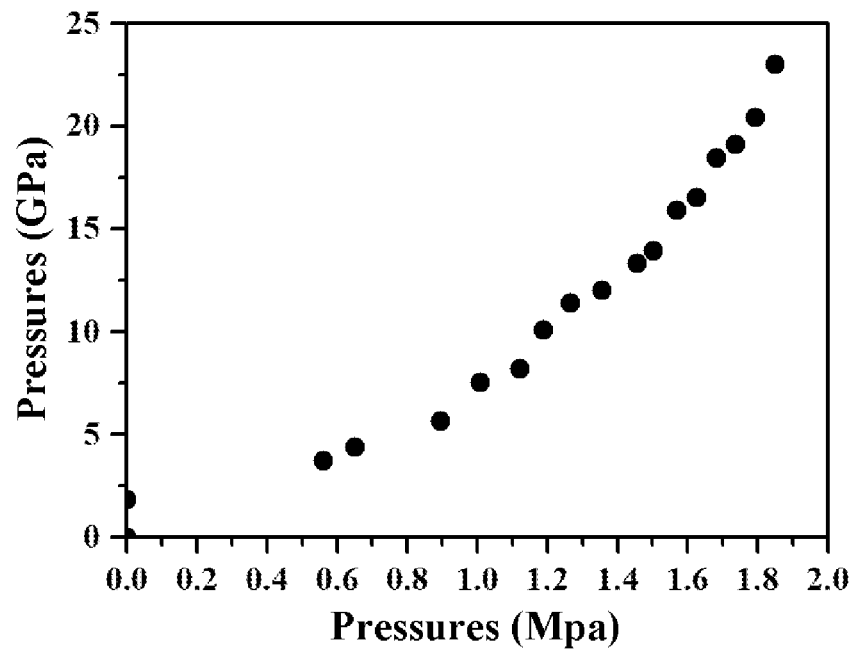
FIG. 2 is a pressure calibration curve diagram provided by the embodiment of the present disclosure.

In the standard pressure experiment, the gas diaphragm driven rapid supercharging device based on diamond anvil cells is applied. Firstly, the nitrogen is introduced into the gas bottle 1, and the output gas pressure is controlled by the pressure controller 2. Then, the first valve 13 is opened and the second valve 14 is closed, and the calibration spectrum experiments of different loading gas pressure and ruby fluorescence pressure placed in the pressure chamber of the diamond anvil cell press 8 are carried out. By applying different gas pressures, a conventional pressure boosting curve is obtained. As shown in FIG. 2, the pressure calibration curves with different gas pressures in the sample chamber are obtained.

Figure 3:
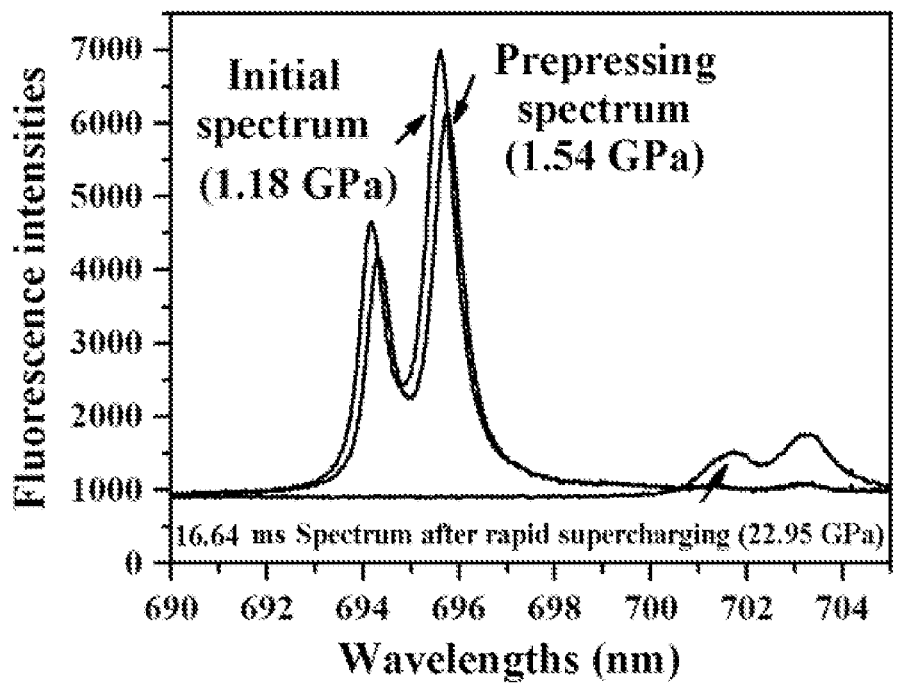
FIG. 3 is a ruby fluorescence diagram when different pressures are applied provided by the embodiment of the present disclosure.

In the supercharging experiment, firstly, ruby is reloaded in the sample chamber of the ruby standard pressure system 11, and the sample is packaged by preloading, and the pressure of the packaged sample chamber is 1.18 GPa. The first valve 13 is closed and the second valve 14 is opened. The gas pressure corresponding to the required loading pressure is found according to the pressure calibration curve in FIG. 2, the corresponding gas pressure is inflated into the gas accumulator 3 by the pressure controller 2, and the second valve 14 is closed. The gas pressure of 0.1 MPa is applied to ensure that all parts are compacted, and the ruby fluorescence peaks change obviously. As shown in FIG. 3, the corresponding sample chamber pressure is 1.54 GPa. The gas accumulator 3 is inflated in advance, the gas pressure of 1.85 MPa is accumulated, and according to the pressure calibration curves, the pressure of above 20 GPa can be obtained. By triggering the switch of the electromagnetic valve 5, the pressure of the gas accumulator 3 is controlled, the gas diaphragm 7 is rapidly inflated, and then the driving pressure of 1.85 MPa is rapidly applied to the sample.

Figure 4:
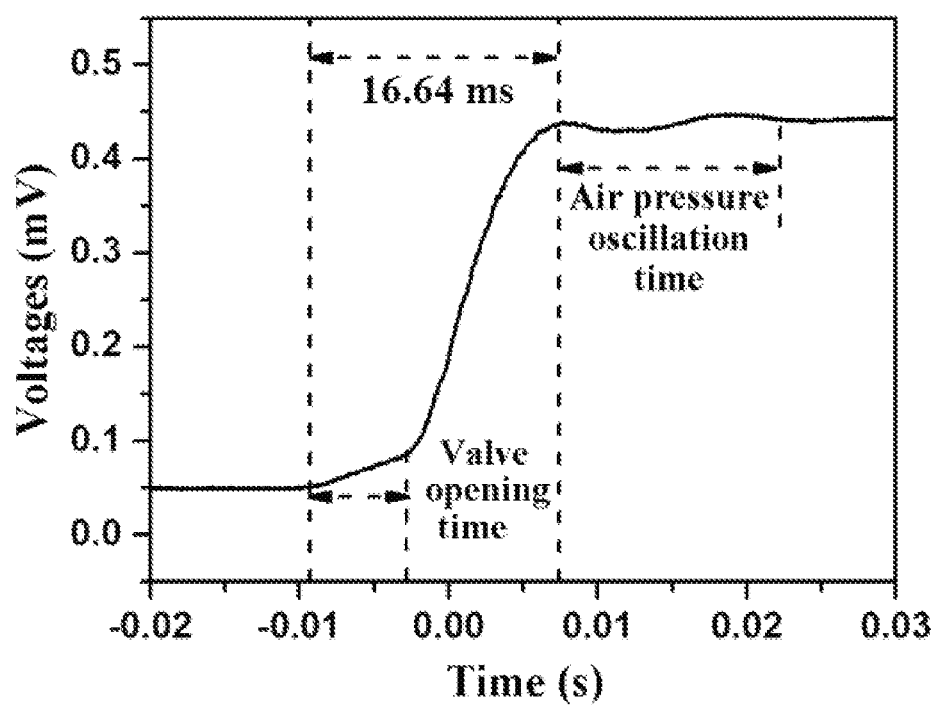
FIG. 4 is a rapid electromagnetic valve supercharging curve diagram provided by the embodiment of the present disclosure.

By setting the trigger condition of the oscilloscope 12, the trigger condition is the change of the voltage of the oscilloscope 12. The time of a driving pressure jump is recorded by a single trigger, that is, the instantaneous pressure change time is reflected by recording the time of voltage change of the oscilloscope 12, and the ruby pressure in the sample chamber is calibrated by using the ruby standard pressure system 11. As shown in FIG. 4, the pressure in the sample chamber is obtained to be 23 GPa, and the pressure generation time of the oscilloscope 12 is observed to be 16.64 ms.

All embodiments in this specification are described in a progressive manner. Each embodiment focuses on differences from other embodiments. For the part that is the same or similar between different embodiments, reference may be made between the embodiments.

Several examples are applied for illustration of the principles and implementation methods of the present disclosure. The description of the embodiments is used to help illustrate the method and the core principles of the present disclosure; and meanwhile, those skilled in the art can make various modifications in terms of specific embodiments and scope of application in accordance with the teachings of the present disclosure. In summary, the contents of this specification should not be understood as the limitation of the present disclosure.

What is claimed is:

1. A gas diaphragm driven rapid supercharging device based on a diamond anvil cell, comprising:
   a gas diaphragm, a diamond anvil cell press, a hard steel shell and a gas release component, wherein the gas diaphragm and the diamond anvil cell press are positioned inside the hard steel shell, the gas diaphragm is positioned below the diamond anvil cell press, a first opening is formed in a top of the hard steel shell, and a second opening is formed in a bottom of the hard steel shell; and wherein the gas release component passes through the second opening of the hard steel shell to be connected with the gas diaphragm through a first gas path, and the gas release component is configured for releasing gas at a first inflation speed in a standard pressure experiment, and inflating the gas diaphragm at different driving pressures to obtain a pressure calibration curve; and the gas release component is configured for presetting a driving pressure according to the pressure calibration curve in a supercharging experiment, and inflating the gas diaphragm at a second inflation speed;

wherein the gas release component comprises:

a gas bottle, a pressure controller, a first valve, a second valve, a gas accumulator and an electromagnetic valve;

the gas bottle is connected with the pressure controller through a second gas path, the pressure controller is respectively connected with a first port of the first valve and a first port of the second valve through third gas paths, and a second port of the first valve is connected with the gas diaphragm through a fourth gas path; a second port of the second valve is connected with the gas accumulator through a fifth gas path, the gas accumulator is connected with an air inlet of the electromagnetic valve through a sixth gas path, and an air outlet of the electromagnetic valve is connected with the gas diaphragm through a seventh gas path;

in the standard pressure experiment, the first valve is opened, the second valve is closed, the gas bottle inputs the gas into the pressure controller, and the pressure controller is configured for adjusting a speed and a pressure of the gas passing through the first valve, so that the gas is released at the first inflation speed and inflated into the gas diaphragm at different driving pressures to obtain the pressure calibration curve;

in the supercharging experiment, the second valve is opened, the first valve is closed, the gas bottle inputs the gas into the pressure controller; the pressure controller presets the driving pressure according to the pressure calibration curve, and adjusts a speed and a pressure of the gas passing through the second valve, so that the gas is inflated into the gas accumulator and a preset value of the driving pressure is reached; and when a pressure of the gas in the gas accumulator reaches the preset value, the second valve is closed, the electromagnetic valve is opened and closed at first opening and closing time, and the gas accumulator inflates the gas diaphragm at the second inflation speed;

the gas diaphragm driven rapid supercharging device based on the diamond anvil cell further comprising:

a pressure transmitter and an oscilloscope;

wherein the pressure transmitter is connected with the electromagnetic valve through an eighth gas path and is connected with the gas diaphragm through a ninth gas path, and the pressure transmitter is configured for detecting instantaneous changes of a gas pressure and converting gas pressure changes into electrical signals.

2. The gas diaphragm driven rapid supercharging device based on the diamond anvil cell according to claim 1, further comprising:

a ruby standard pressure system;

wherein the ruby standard pressure system is arranged above the diamond anvil cell press, and the ruby standard pressure system is configured for calibrating ruby pressure changes in the diamond anvil cell press.

3. The gas diaphragm driven rapid supercharging device based on the diamond anvil cell according to claim 1, wherein the gas release component further comprises:

a pressure gauge; and wherein the pressure gauge is positioned between the gas accumulator and the electromagnetic valve, and the pressure gauge is configured for measuring the pressure of the gas in the gas accumulator.

4. The gas diaphragm driven rapid supercharging device based on the diamond anvil cell according to claim 1, further comprising:

cushion blocks;

wherein the cushion blocks are positioned among the diamond anvil cell press, the gas diaphragm and the hard steel shell, and the cushion blocks are configured for filling gaps.

5. The gas diaphragm driven rapid supercharging device based on the diamond anvil cell according to claim 1, wherein the gas is nitrogen.

* * * * *